(12) United States Patent
Lapidous et al.

(10) Patent No.: US 9,602,411 B2
(45) Date of Patent: Mar. 21, 2017

(54) SYSTEM AND METHOD FOR SUPPRESSING DNS REQUESTS

(71) Applicant: AnchorFree Inc., Mountain View, CA (US)

(72) Inventors: Eugene Lapidous, Saratoga, CA (US); Roman Kuzmenko, San Jose, CA (US); Maxim Molchanov, Mountain View, CA (US)

(73) Assignee: ANCHORFREE INC., Menlo Park, CA (US)

( * ) Notice: Subject to any disclaimer, the term of this patent is extended or adjusted under 35 U.S.C. 154(b) by 222 days.

(21) Appl. No.: 14/606,651

(22) Filed: Jan. 27, 2015

(65) Prior Publication Data

US 2016/0218978 A1     Jul. 28, 2016

(51) Int. Cl.
*H04L 12/801* (2013.01)
*H04L 29/12* (2006.01)

(52) U.S. Cl.
CPC .......... *H04L 47/12* (2013.01); *H04L 61/1511* (2013.01); *H04L 61/6009* (2013.01); *H04L 61/6013* (2013.01)

(58) Field of Classification Search
None
See application file for complete search history.

(56) References Cited

U.S. PATENT DOCUMENTS

| | | | | |
|---|---|---|---|---|
| 7,441,043 B1* | 10/2008 | Henry | ................. | H04L 29/1233 709/238 |
| 7,620,733 B1* | 11/2009 | Tzakikario | .............. | G06F 15/16 709/229 |
| 7,984,163 B2* | 7/2011 | Almog | .............. | H04L 29/12066 370/386 |
| 2002/0010798 A1* | 1/2002 | Ben-Shaul | .......... | G06F 17/3089 709/247 |
| 2003/0169713 A1* | 9/2003 | Luo | ........................ | H04L 63/04 370/338 |
| 2003/0182447 A1* | 9/2003 | Schilling | ........... | H04L 29/12066 709/245 |
| 2006/0031394 A1* | 2/2006 | Tazuma | ............ | G06F 17/30887 709/217 |
| 2006/0265516 A1* | 11/2006 | Schilling | ........... | H04L 29/12066 709/245 |
| 2008/0140847 A1* | 6/2008 | Almog | .............. | H04L 29/12066 709/228 |

(Continued)

*Primary Examiner* — Ninos Donabed
(74) *Attorney, Agent, or Firm* — David R. Stevens; Stevens Law Group

(57) ABSTRACT

A virtual private router (VPR) intercepts DNS requests and returns a pseudo IP address to the requesting application and the pseudo IP address is mapped to a domain name in the request. Requests for content including the pseudo IP address are modified to include the corresponding domain name and transmitted to an intermediary server, which resolves the domain name to a real IP address and forwards the content request. The content is received by the intermediary server, which returns it to the requesting application, such as by way of the VPR. Real IP addresses may be returned by the intermediary server such that subsequent content requests to the domain name may bypass the intermediary server. Requests for certain domains, ports, and/or protocols may bypass the intermediary server such that the VPR resolves the domain names to real IP addresses.

3 Claims, 15 Drawing Sheets

(56) References Cited

U.S. PATENT DOCUMENTS

| | | | |
|---|---|---|---|
| 2009/0022152 A1* | 1/2009 | Henry | H04L 29/1233 370/389 |
| 2012/0246315 A1* | 9/2012 | Kagan | H04L 61/1511 709/225 |
| 2013/0111540 A1* | 5/2013 | Sabin | G06F 21/554 726/1 |
| 2013/0246605 A1* | 9/2013 | Mahadik | H04L 63/1433 709/224 |
| 2014/0214958 A1* | 7/2014 | Cheshire | H04L 61/1511 709/204 |
| 2014/0359769 A1* | 12/2014 | Sabin | G06F 21/554 726/23 |

* cited by examiner

SYSTEM AND METHOD FOR SUPPRESSING DNS REQUESTS

RELATED APPLICATIONS

This application is related to U.S. application Ser. No. 14/606,566 filed Jan. 27, 2015 and U.S. application Ser. No. 14/606,610 filed Jan. 27, 2015. The applications are incorporated herein by reference for all purposes.

BACKGROUND

Most of the content available on the Internet is associated with Universal Resource Locators (URL), which reference content servers by their domain names. To request the content from a specific content server, its domain name must be translated to a numerical IP address. This translation is performed by the Domain Name Service (DNS). Before issuing content request, the client computer asks a DNS server to map requested domain name to an IP address. The client may cache the DNS response for an allowed interval (time to leave or time to live: TTL), but must issue new DNS request if caching time expires, or if requested domain is not stored in the DNS cache.

Each DNS request increases the time required to fetch the content: the client must wait to receive the DNS response before issuing a content request. A slow DNS server may decrease the perceived speed of Internet even when content servers are fast. If a DNS response contains a CNAME record (alias of one domain name to another), the client may need to issue another DNS request, further delaying content retrieval. DNS latency is especially high for mobile networks and can reach 200 to 300 ms for 3G networks.

One known way to suppress client-side DNS requests is to send HTTP or HTTPS traffic from the client computer through a proxy server, while supplying domain name with each content request. If the client-side application is aware that it's connected trough the proxy server (for instance, Internet Explorer browser, distributed by Microsoft Corporation, provides support for proxy settings), it doesn't issue DNS requests. Instead, the proxy server issues its own DNS requests for specified domains.

Shifting DNS resolution to a proxy server usually decreases overall latency (especially when client is connected to the mobile network) as well as client-side data traffic. If multiple users are connected to the same proxy server with large DNS cache, it increases the probability that requested DNS response is already cached, further increasing performance. However, multiple client applications, especially on mobile devices, do not support proxy settings and continue to issue DNS requests even when being connected through a proxy server that discards client-side DNS results and issues its own DNS requests. Client-side DNS requests are also discarded when client is connected through a VPN server that terminates HTTP and/or HTTPS connections and uses its own DNS resolver.

Therefore, there is a need to decrease number of DNS requests from the client computer over the computer network, especially when client computer is connected to a proxy or VPN server.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
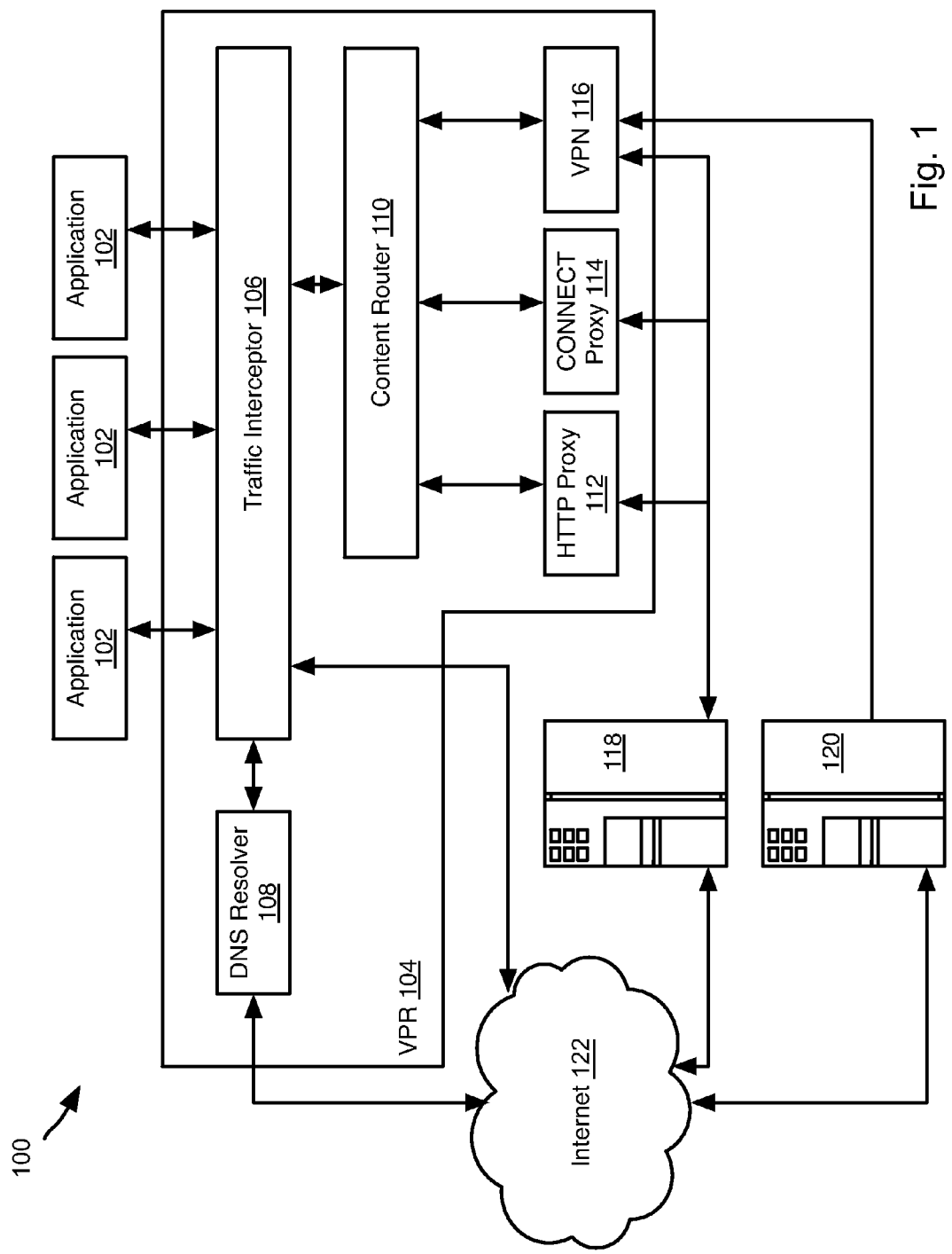
FIG. 1 is a schematic block diagram of a network environment for performing methods in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Software on a client computer, further referred to as a Virtual Private Router (VPR), intercepts one or more DNS requests initiated by one or more client applications, returns pseudo IP address for the requested domain name, and stores correspondence between requested domain name and returned pseudo IP address. The pseudo IP address is not required to correctly map requested domain to a real content server.

After returning one or more pseudo IP addresses, VPR detects one or more content requests having a pseudo IP address as a destination, retrieves domain name corresponding to detected pseudo IP address and then submits content request together with a descriptor of a retrieved domain name to an intermediary server. The intermediary server resolves a descriptor of the submitted domain name to an IP address corresponding to a real content server, which forwards content requests to that server and returns content response to the client computer. As a result, client application receives requested content without sending DNS requests over the computer network, thereby decreasing latency and amount of data traffic.

In one embodiment, the VPR determines whether the content request should be sent through an intermediate server or should bypass an intermediary server. If the content request should bypass an intermediary server, the VPR issues a DNS request over the computer network and returns real IP address; if the content request should be sent through an intermediary server, VPR returns pseudo IP address without issuing a DNS request over the computer network.

The determination whether to send the content request through an intermediary server can depend on a set of routing rules associated with one or more parameters from the group of domain name, port, and protocol. In one implementation, the VPR determines whether request should bypass an intermediary server before returning a response to an intercepted DNS request; this determination is made by matching requested domain name to one or more routing rules.

In another implementation, the VPR always returns pseudo IP address after intercepting DNS request, and then, upon receiving a content packet having pseudo IP address as a destination, obtains one or more parameters from the group of domain name associated with that IP address, port and protocol, matches obtained parameters with one or more routing rules and, if content request should bypass an intermediary server, issues its own DNS request for a real IP address of the obtained domains name, and then issues direct content request using obtained real IP address.

In one embodiment, the pseudo IP address is a non-routable IP address. In one implementation, non-routable IP address is selected from the group of non-routable IPv4 addresses within at least one of the ranges 10.0.0.0-10.255.255.255, 172.16.0.0-172.31.255.255 and 192.168.0.0-192.168.255.255. In another implementation, the pseudo IP address is a non-routable IPv6 address. In one other implementation, non-routable IP addresses used as pseudo IP addresses are selected from one or more ranges different from the ranges used by the local network to which client computer is connected. In another implementation, the pseudo IP address is a network address associated with the transport protocol other than IPv4 or IPv6.

In some embodiments, after client sends content request through the VPN tunnel, the VPN server issues its own DNS request for a requested domain name and replaces destination IP address with the one obtained from the DNS request. In one embodiment, this replacement is performed after dis-encapsulating the traffic from the VPN tunnel. In another embodiment, it is performed while the traffic is still encapsulated inside the VPN tunnel. HTTP and HTTPS proxy servers typically must issue their own DNS requests because their data packets don't contain real destination IP address (it is replaced by the address of the proxy server in some embodiments). Prior art VPN servers don't perform additional DNS requests for data packets already containing destination IP: they just remove encapsulation headers and send original packets to their destinations.

In one embodiment, retrieval of the domain corresponding to detected IP address comprises extracting subset of the pseudo IP address and using that subset to reference stored domain name, thereby allowing to keep the same reference between IP address and domain name for different ranges of pseudo IP addresses. In one implementation, retrieved subset of the pseudo IP address contains no more than 20 lowest bits of the 32-bit integer representation of the IPv4 pseudo IP address.

In one embodiment, VPR returns pseudo IP address with a large TTL value, thereby decreasing number of DNS request that must be intercepted.

In one embodiment, intermediary server includes at least one proxy server; VPR redirects content request from one or more client-side applications to a client side proxy, which forwards the request to that proxy server over a computer network together with requested domain. In one implementation, one or more HTTP content requests are submitted to a client side HTTP proxy, which forwards requested domain inside HOST header. In another implementation, one or more HTTPS content requests are submitted to a client side HTTPS proxy, which forwards requested domain inside SNI header. In one other implementation, one or more TCP content requests are submitted to client side connect-proxy, which forwards requested domain inside CONNECT header.

In one embodiment, intermediary server resolves descriptor of the requested domain name to an IP address by issuing a DNS request. In one implementation, descriptor of the domain name comprises a text string specified in the DNS request intercepted by VPR. In another implementation, descriptor of the domain name is a pointer to a text string, while an intermediary server obtains the value of the text string from a data storage pointed by the descriptor, before resolving requested domain name to an IP address.

In one embodiment, VPR submits two or more content request to at least two different intermediary servers; intermediary server for each content request is determined by obtaining one or more parameters of the content request from the group of domain name associated with that IP address, port and protocol, and then matching these parameters with one or more routing rules.

In another embodiment, intermediary server is a VPN server; VPR encapsulates one or more content requests inside the VPN tunnel between the client computer and the VPN server. In one implementation, VPR submits descriptor of the requested domain name inside the VPN tunnel. In one implementation, descriptor of the requested domain name is added to the set of data packets of a TCP or a UDP connection having pseudo IP as a destination IP address, before these data packets are encapsulated inside the VPN packets.

In some embodiments, intermediary server sends real IP address (one it resolved by issuing its own DNS request) back to the client, together with content data. Client later uses that address to issue requests in bypass of the intermediary server, without issuing its own DNS requests. The client thereby uses the intermediary server in this embodiment to avoid sending DNS requests, but only until it gets real IP in the response. As a result, client mitigates performance degradation due to the additional hop through the intermediary server, while still using pseudo IPs instead of its own DNS requests.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider). Computer networks may use transport protocols other than Internet Protocol. Correspondingly, present invention could be implemented for types of network addresses other than IP addresses.

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 illustrates an example network architecture 100 in which the methods disclosed herein may be implemented. In particular, a computing device, such as a the computing device 1300 of FIG. 13 may store and execute one or more applications 102. In particular, the applications 102 may include such applications as a web browser or other application that sends or receives data from a remote device over a network.

The computing device 1300 may likewise host a virtual private router (VPR) 104, the functionality of which is described in greater detail below. In particular, the VPR 104 may include a traffic interceptor 106 that intercepts both of requests for domain name resolution (e.g. domain name service (DNS) requests) as well as requests for content or transmission of content from the applications 102.

DNS resolution requests may be processed by a DNS resolver 108. As described in greater detail below DNS resolver 108 may receive a DNS resolution request from an application 102 and, in response, return a non-routable IP address (hereinafter "pseudo IP address") to the application 102. In some embodiments and circumstances, the DNS resolver 108 may respond to DNS requests from an application 102 by transmitting an actual DNS request to a DNS server, receiving a mutable IP address (hereinafter also referred to as a "real IP address") and return the routable IP address to the application 102. The DNS resolver 108 may record mappings between domain names and pseudo IP addresses generated by the DNS resolve 108 in response to requests to resolve the domain names. The DNS resolver 108 may also store mappings between domains and real IP addresses resolved by the DNS resolver 108.

The VPR 104 may further include a content router 110. Requests for content received from an application 102 is processed by the content router 110 by identifying a pseudo IP address in the content request, retrieving a domain name mapped to that pseudo IP address, and outputs a modified content request that includes the domain name. Responses to content requests tray be received by the content router 110 and returned to the application 102.

The modified content requests may be processed by an appropriate module 112-116 corresponding to the content request. For example, HTTP content requests may be processed by an HTTP proxy 112, a CONNECT content request may be processed by a CONNECT proxy 114. Communications within a VPN tunnel may be processed by a VPN module 116. Content requests and other communications may then be transmitted by the modules 112-116 to an intermediate server 118. In some embodiments, the VPR 104 may implement more or fewer then the illustrated modules 112-116. In some embodiments, the VPR may further implement a firewall for preventing unauthorized access.

In one embodiment, intermediary server 118 includes at least one proxy server. The VPR 104 redirects DNS request including a requested domain from one or more client-side applications to a client side proxy (e.g. one of modules 112-116), which forwards the request to the intermediary server 118 operating as a proxy server over a computer network together with requested domain. In one implementation, one or more HTTP content requests are submitted to a client side HTTP proxy 112, which forwards requested domain inside a HOST header. In another implementation, one or more HTTPS content requests are submitted to a client side HTTPS proxy, which forwards requested domain inside an SNI (server name identification) header. In one other implementation, one or more TCP content requests are submitted to client side CONNECT proxy 114, which forwards requested domain inside a CONNECT header.

In one implementation, VPR submits two or more content requests to at least two different intermediary servers; intermediary server for each content request is determined by obtaining one or more parameters of the content request from the group of domain name associated with that IP address, port and protocol, and then matching these parameters with one or more routing rules. For instance, intermediary server for requested domain is selected to retrieve content specific to the location of intermediary server (such as local news), or to improve performance (for instance, to minimize deviation from the direct route between the client and the content server).

The illustrated components of the VPR 104 may be stored and executed by a single client device 1300 or distributed across multiple computing devices, such as on a gateway computer or a router connected to the client device 1300 by a local or some other network.

The intermediate server 118 may receive the modified content requests and other communications, extract the domain name, resolve the domain name to an IP address, and forward the modified content request to that IP address. In some embodiments, an intermediary server 120 may received the content requests and may be embodied as a VPN server that manages VPN connections while reducing DNS requests as described in greater detail below. The intermediary server 118 may also function as a VPN server or forward content requests and other communications within a VPN tunnel to some other VPN server.

The intermediary servers 118, 120 may be coupled to the Internet 122 or some other network such as a local area network (LAN), wide area network (WAN) or some other network. Connections to the Internet 122 may be by means of any wired or wireless connection. Servers that are the target for content requests and transmit responses thereto may be understood to be included in the Internet 122 and may include any device that may be addressed by network communications and transmit a response thereto. The computing device 1300 (see FIG. 13) that stores and executes the applications 102 and VPR 104 may likewise transmit and receive data from the internet such as requests for DNS name resolution and responses thereto.

Figure 2:
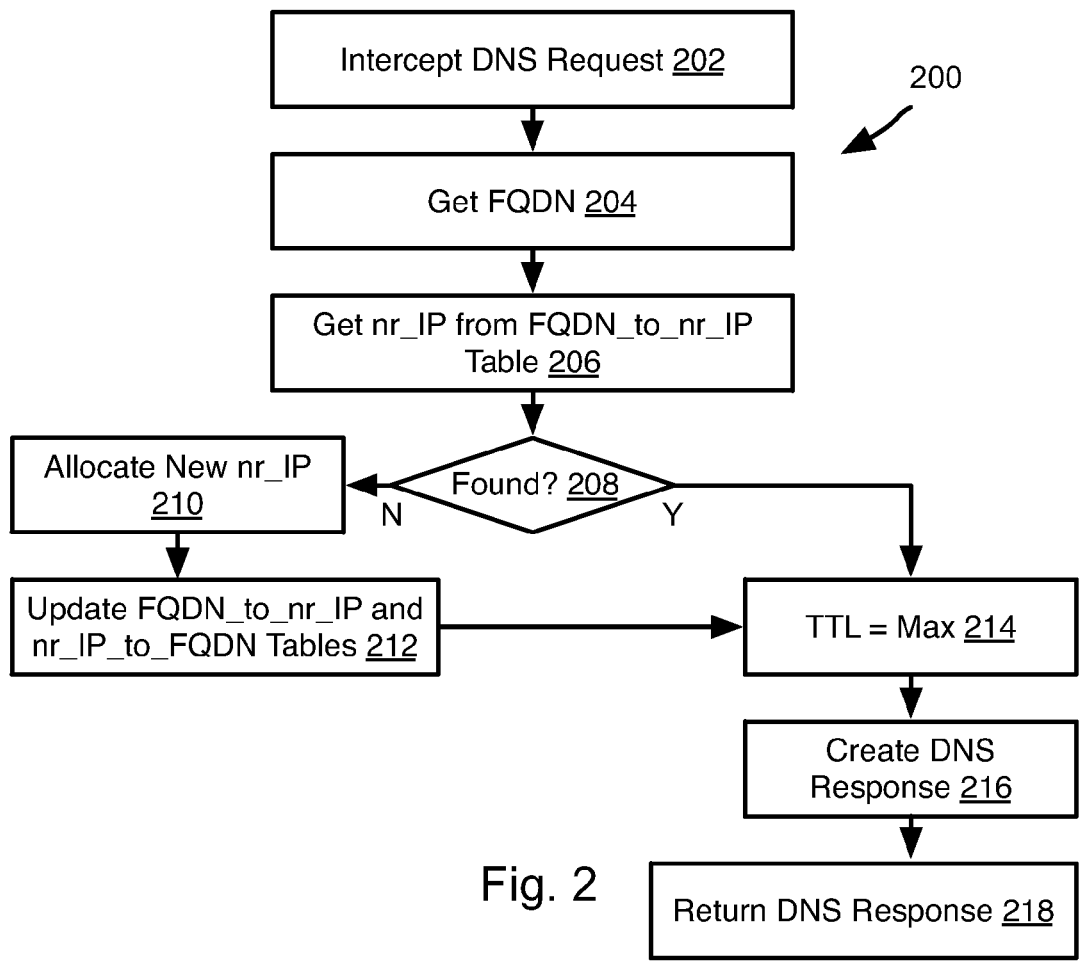
FIG. 2 is a process flow diagram of a method for suppressing DNS requests in accordance with an embodiment of the present invention.

FIG. 2 illustrates a method 200 that may be executed by a VPR 104, specifically the DNS resolver 108. The method 200 may include intercepting 202 a DNS request and getting 204 from the DNS the fully qualified domain name (FQDN) from the DNS request. An attempt is made to get 206 a pseudo IP corresponding to the FQDN from a table mapping FQDNs to pseudo IPs (FQDN_to_nr_IP table). The FQDN_to_nr_IP table may be a hash table taking an FQDN as a key and the corresponding pseudo IP address as the value corresponding to that key. Other tables described herein may likewise be embodied as hash tables.

If an entry determined 208 to not be found in the table, then a new pseudo IP address (nr_IP) is allocated 210. The allocated pseudo IP address may be unique within the scope of the VPR or some other name space within the VPR such that the pseudo IP address will uniquely resolve to the FQDN obtained at step 204. In one implementation, the pseudo IP address is allocated 210 from the group of non-routable IPv4 addresses within at least one of the ranges 10.0.0.0-10.255.255.255, 172.16.0.0-172.31.255.255 and 192.168.0.0-192.168.255.255. In another implementation, the pseudo IP address is a non-routable IPv6 address. In one other implementation, non-routable IP addresses used as pseudo IP addresses are selected from one or more ranges different from the ranges used by the local network to which client computer is connected.

In one implementation, non-routable IP addresses used as pseudo IP addresses are selected from one or more ranges different from the ranges used by the local network to which client computer is connected. In one embodiment, retrieval of the domain corresponding to detected IP address comprises extracting a subset of the pseudo IP address and using that subset to reference stored domain name, thereby allowing one to keep the same reference between IP address and domain name for different ranges of pseudo IP addresses. For example, pseudo IP addresses of length M bits may be stored as only the least significant N bits, N<M. In one implementation, retrieved subset of the pseudo IP address contains no more than 20 lowest bits of the 32-bit integer representation of the IPv4 pseudo IP address.

For instance, the VPR 104 receives a DNS request for a domain "example.com", which doesn't have a valid entry in the FQDN_to_nr_IP table. To avoid conflict with other resources on the local network, VPR should return a pseudo IP address in an IP range different from the range used by the current local network. For example, if user is currently connected to a local network with IP addresses within a range 192.168.0.0-192.168.255.255, VPR returns pseudo IP in a range 10.0.0.0-10.255.255.255 (for instance, 10.17.18.19 having last 20 bits equal to 0x11213), after making sure that no other FQDN is associated with the pseudo IP address having the same last 20 bits in the FQDN_to_nr_IP or in the nr_IP_to_FQDN table. The unique pair <FQDN→last 20 bits of pseudo IP address"> is stored in both FQDN_to_nr_IP table (domain as a key) and in the nr_IP_to_FQDN table (last 20 bits of pseudo IP address as a key).

At some later time, the user may switch to a different local network, for instance with IP addresses in a range 10.0.0.0-10.255.255.255. After receiving another DNS request for a domain "example.com", VPR retrieves the last 20 bits of the pseudo IP from nr_IP_to_FQDN table, and then returns pseudo IP for a different range (for instance, 172.16.0.0-172.31.255.255), for example, pseudo IP 172.17.18.18, having last 20 bits 0x11213. In this manner, the tables do not need to be changed in response to the user switching to a different range of local IP addresses. In one other example, different number of bits of pseudo IP address can be stored, while remaining smaller than the number of bits describing the real IP address. For instance, FQDN_to_nr_IP and nr_IP_to_FQDN tables may store 16 least significant bits of IPv4 address, or store portions of IPv6 address without at least some bits of the routing prefix, subnet identifier or an interface identifier.

In another example, both FQDN_to_nr_IP and nr_IP_to_FQDN store full pseudo IP address (10.17.18.19), but the most significant bits or other bits are ignored while generating pseudo IP address in another range having the same low bits. As a result, the same reference between pseudo IP and domain name can be used in different local networks without the risk of conflicting with non-routable IP addresses assigned to local resources. This allows one to keep stored references longer, instead of clearing portions of FQDN_to_nr_IP and nr_IP_to_FQDN tables after detecting the switch of the local network.

The method 200 further includes updating 212 the FQDN_ to_nr_IP table to map the FQDN obtained at step 204 to the allocated 210 pseudo IP address. Likewise, an entry is created in a nr_IP_to_FQDN table that maps the allocated 210 pseudo IP addresses to the FQDN obtained at step 204.

A time to leave (TTL) for the pseudo IP address is set 214 to the maximum allowable value for a given DNS protocol implemented by the VPR 104 and/or the application, or to another value large enough to reduce the frequency of DNS requests for the same FQDN, for instance one larger than the TTL value used for the real IP address. This will reduce the number of DNS requests by the application due to expiring of the TTL. A DNS response is created 316 that includes the pseudo IP address allocated at step 210 and the TTL set at step 314 and the DNS response is returned 218 to the application that generated the intercepted 202 DNS request.

In some instances, the TTL of a pseudo IP address may expire such that an application may issue another request to resolve a domain name again or another application may request to resolve a domain name for which a previous resolution request has been intercepted 202. In either case, the FQDN identified at step 204 will be found 208 to have a corresponding entry in the FQDN_to_nr_IP table. In response, the method 200 may include setting 214 to a maximum value the TTL for the pseudo IP address from the table corresponding to the FQDN at step, creating 216 a DNS response including the pseudo IP address mapped to the FQDN in the table and the TTL set at step 214, and returning 218 the DNS response to the application that generated the intercepted 202 DNS request. TTL may also be set to some other value that is large enough to reduce the frequency of DNS requests for the same FQDN, for instance one larger than the TTL value used for the real IP address.

The method of FIG. 2 advantageously suppresses DNS requests thereby reducing latency, particularly for mobile devices.

Figure 3:
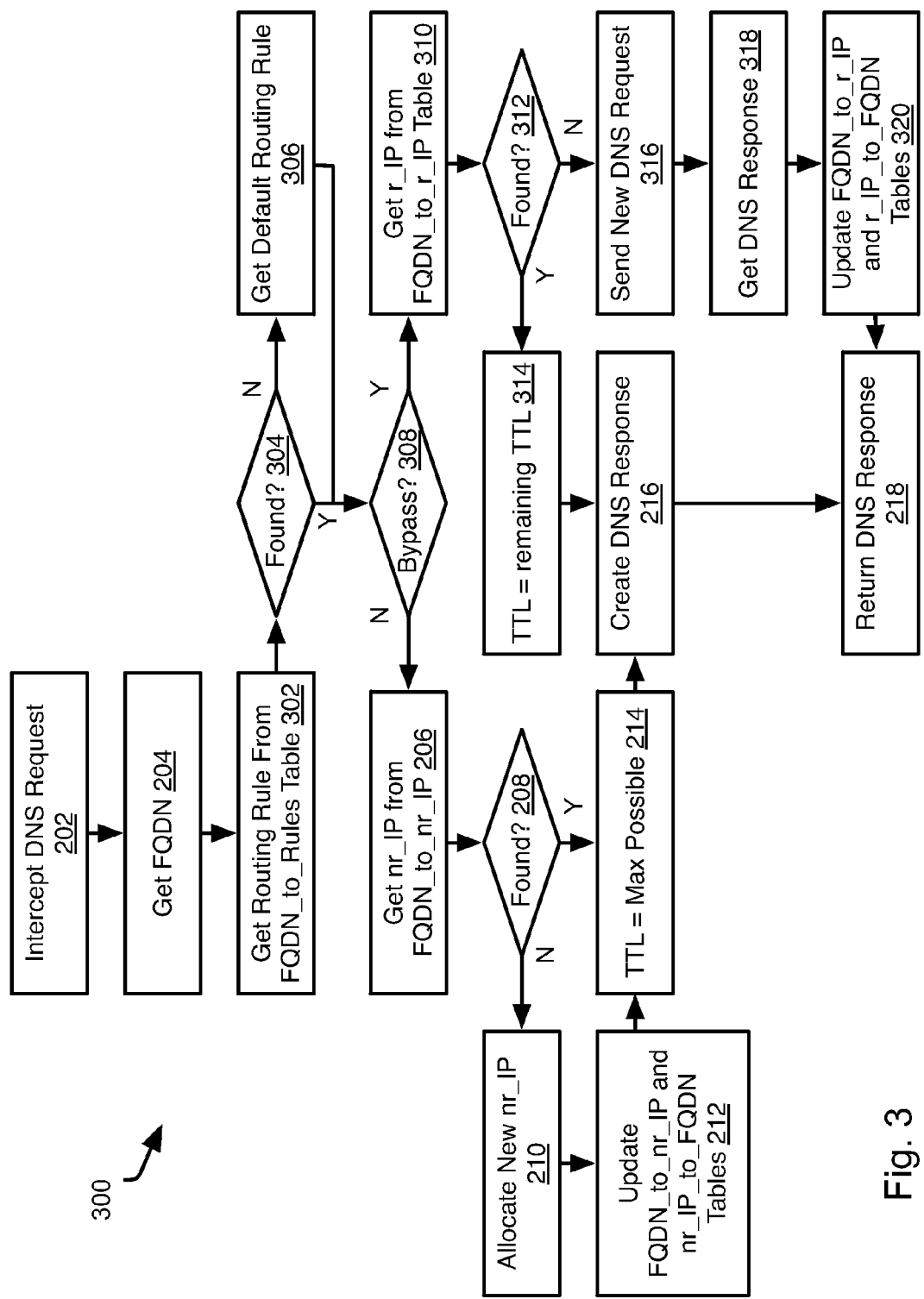
FIG. 3 is a process flow diagram for bypassing DNS request suppression for some domain names in accordance with an embodiment of the present invention.

Referring to FIG. 3, in some embodiments the VPR 104, specifically the DNS resolver 108, may bypass some DNS requests from the process illustrated in FIG. 2. For example, the intermediary server 118, 120 may not be geographically proximate the computing device 1300 hosting the VPR 104. Accordingly, some domains may provide access to location-specific content, such as local news, sports, weather, retailers, etc. It therefore may be advantageous to have the VPR 104 resolve the DNS request rather than the remote intermediary server 118, 120.

For example, the method 300 may include intercepting 202 a DNS request and getting 204 a FQDN from the DNS request as described above with respect to FIG. 2. The method 300 may further include attempting to get 302 a routing rule corresponding to the FQDN, such as from a FQDN_to_rules table that maps FQDNs to routing rules. If a rule is determined 304 to not be found, the method 300 may include getting 306 a default routing rule. If the rule from the table or the default rule is determined 308 to not require bypassing of the intermediary server 118, 120, then the method 300 may include performing steps 206-218 as described above with respect to FIG. 2 in which a pseudo IP address is returned to the application that issued the intercepted 202 DNS request.

If the routing rule from the table or the default rule is found 308 to require bypass, then the method 300 may include attempting to get 310 a real IP address corresponding to the FQDN from step 204, such as from a FQDN_to_r_IP table that maps FQDNs to corresponding real IP addresses. If an entry is found, then the TTL for the entry is set to the remaining TTL for that real IP address, e.g. the amount of the TTL received for the real IP address from a DNS server that has not yet elapsed since the real IP address was received. A DNS response including the real IP address and the TTL may be created 216 and returned 218 to the requesting application.

If a real IP address is not found corresponding to the FQDN of step 204, then the method 316 may include sending 316 a DNS request to a DNS server including the FQDN of step 204; receiving 318 a response including a real IP address for the FQDN of step 204 and a TTL; updating the FQDN_to_r_IP and r_IP_to_FQDN tables to map the FQDN to the real IP address and the real IP address to the FQDN, respectively; and returning 218 the DNS response received at step 318 to the requesting application. The TTL for the real IP address may also be stored in association with the entries in the FQDN_to_r_IP and r_IP_to_FQDN tables. FQDN_to_r_IP table may contain more that one IP address for the same FQDN; r_IP_to_FQDN table may contain more than one FQDN for the same real IP. In such cases, one of the multiple values associated with same key may be selected by using random selection, round-robin, or other algorithms.

In another implementation, VPR 104 always returns pseudo IP address after intercepting DNS request. For example, steps 206-218 may be performed in every instance regardless of whether a routing rules are determined 308 to require bypassing of the intermediary server 118, 120. In such embodiments, if the routing rules are determined 308 to require bypassing of the intermediary server, the steps 316-320 may be omitted such that a real IP address is not obtained until a content request referencing the FQDN is received.

Where a pseudo IP address is allocated 210 even where bypassing is dictated by the routing rules, the VPR, upon receiving a content packet having a pseudo IP address as a destination, may obtain one or more parameters from the packet, such as some or all of a domain name associated with that pseudo IP address, port and protocol. The VPR 104 then matches the obtained parameters with one or more routing rules and, if content request should bypass an intermediary server per the routing rules, the VPR 104 issues its own DNS request for a real IP address of the obtained domains name and then issues direct content request using obtained real IP address, i.e. transmits the content request to the server addressed by the real IP address without first sending the content request to the intermediary server 118, 120.

Figure 4:
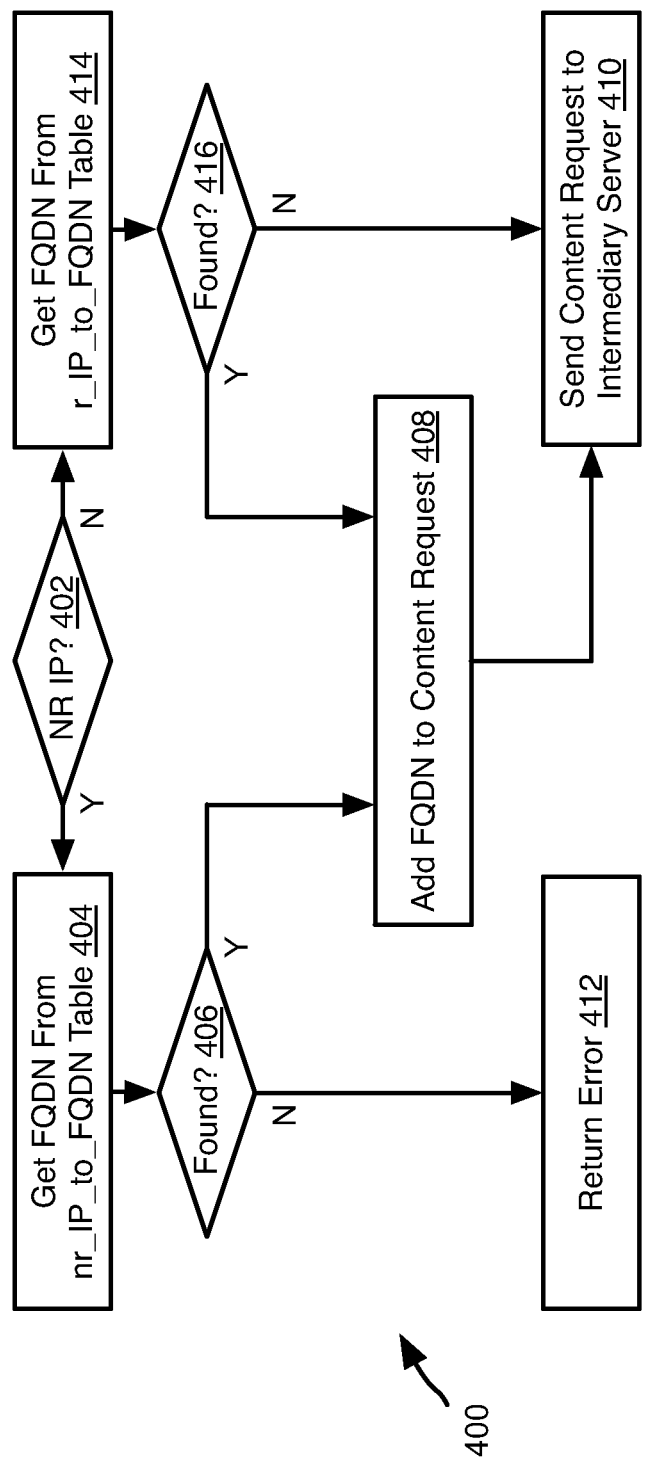
FIG. 4 is a process flow diagram of a method for processing content requests including non-routable IP addresses in accordance with an embodiment of the present invention

FIG. 4 illustrates a method 400 that may be executed by a VPR 104, such as by the content router 110. The method 400 may include determining 402 whether the content request includes a pseudo IP address (i.e. non-routable IP address), such as in the destination IP field of the content request. If so, then the method 400 includes attempting to get 404 the FQDN corresponding to that pseudo IP address from the nr_IP_to_FQDN table. If the pseudo IP address is found 406 in the table, the corresponding FQDN from the table is added 408 to the content request and the content request is sent 410 to the intermediary server 118, 120. If no entry is found 406 for the pseudo IP address, then an error is returned 412.

If the content request is found 402 to not include a pseudo IP address but rather a real IP address, then an attempt is made to get 414 the FQDN corresponding to the real IP address in the r_IP_to_FQDN table. If a FQDN corresponding to the real IP address is not found 416 in the table, or if multiple FQDNs are found for the same real IP address, then the content request may simply be sent 410 to the intermediary server 118, 120 with the real IP address. If a unique FQDN is found, then the FQDN is added 408 to the content request and the content request is then sent 410 to the intermediary server 118, 120.

The method 400 includes sending content requests to the intermediary server 118, 120 in every instance even when the content requests do not include a pseudo IP address. Upon receiving the content requests, real IP addresses may be obtained by the intermediary server 118, 120 for FQDNs included in the content requests, in some embodiments even for content requests that included real IP addresses.

In an alternative embodiment, rather than adding 408 the FQDN to the content request, the VPR 104 sends the content request with the pseudo IP address to the intermediary server 118, 120. The VPR 104 further corresponds with the intermediary server 118, 120 to communicate the current version of the nr_IP_to_FQDN table to the intermediary server 118, 120 prior to intercepting content requests and/or forwarding content requests to the intermediary server 118, 120. Updates to the nr_IP_to_FQDN may be sent periodically or as changes occur, such as each time a new pseudo IP address is allocated 210 or every X milliseconds. In response to receiving a content request, the intermediary server 118, 120 may use its copy of the nr_IP_to_FQDN table to retrieve the FQDN and resolve it to a real IP address.

Figure 5:
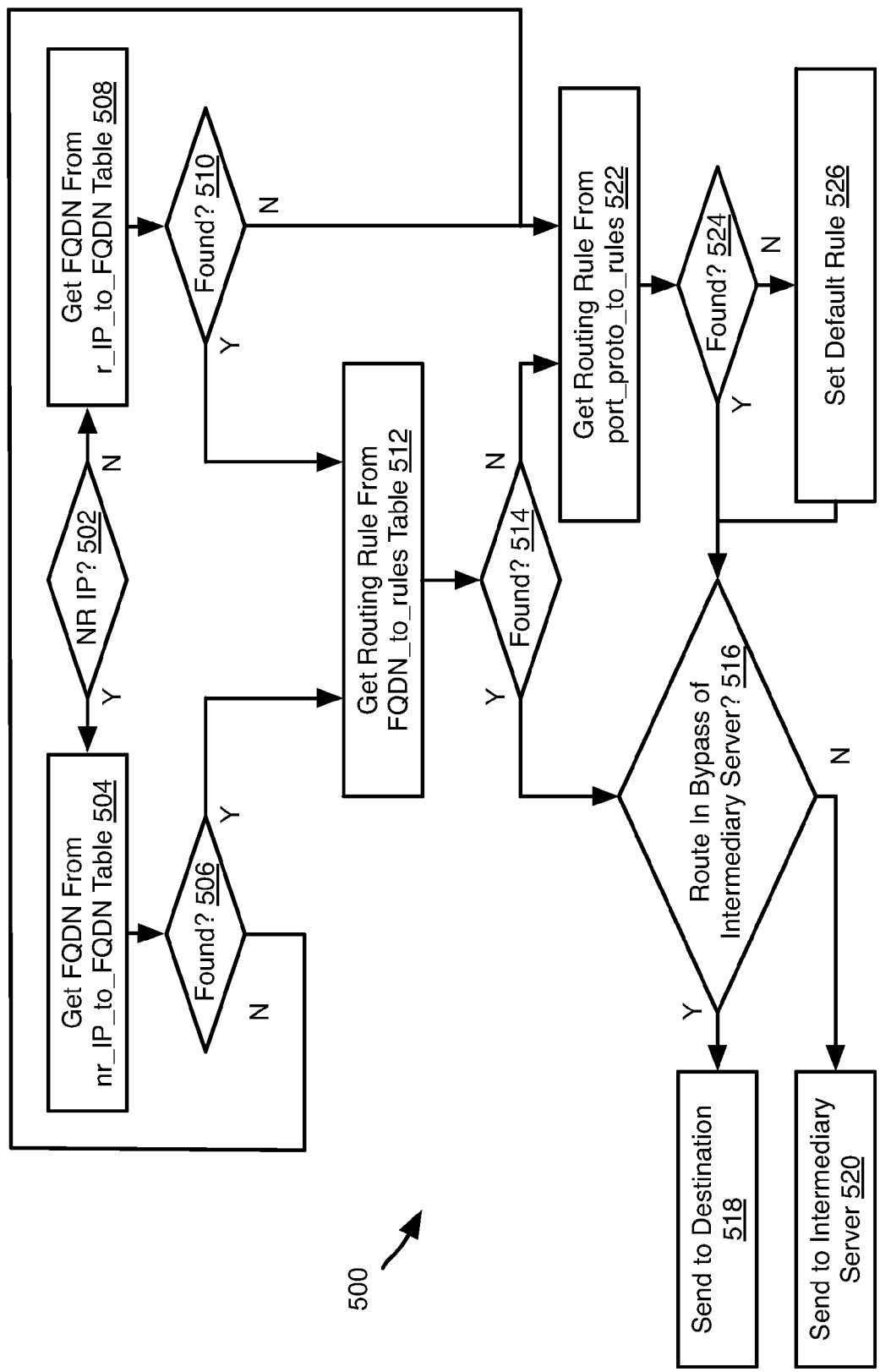
FIG. 5 is a process flow diagram of a method for processing content requests with non-routable IP addresses with application of intermediate server bypass rules in accordance with an embodiment of the present invention.

FIG. 5 illustrates a method 500 that may be executed by a VPR 104, such as by the content router 110 and that includes bypassing the intermediary server 118, 120 under certain circumstances. As noted above, bypassing of the intermediary server 118, 120 may advantageously be done for certain domains for various reasons, such as to ensure that locally relevant content is returned in response to the content requests.

The method 500 may include determining 502 whether the content request includes a pseudo IP address (i.e. non-routable IP address). If so, then the method 500 includes attempting to get 504 the FQDN corresponding to that pseudo IP address from the nr_IP_to_FQDN table. If the pseudo IP address is found 506 in the table, then an attempt may be made to get 512 a routing rule corresponding to the FQDN gotten at step 504 from a table, such as a FQDN_to_rules table that maps routing rules to FQDNs.

If the content request is found 502 to not include a pseudo IP address but rather a real IP address, then an attempt is made to get 508 the FQDN corresponding to the real IP address in the r_IP_to_FQDN table. If a FQDN corresponding to the real IP address is found 510 in the table, then an attempt may be made to get 512 a routing rule corresponding to the FQDN gotten at step 508 from a table, such as the FQDN_to_rules table. If r_IP_to_FQDN table contains multiple FQDNs for the same real IP, the rule can be selected from the set of rules for these FQDNs. For instance, send the content request through the intermediate server if at least one of these FQDNs has association with this rule.

If a routing rule is found 514 for the FQDN obtained at step 504 or 508, then the method 500 may include determining 516 whether the routing rule requires bypassing of the intermediary server 118, 120 by content requests. If so, then the content request is sent 518 to the destination specified in the content request. Specifically, if the content request includes a real IP address, then the content request is sent to that real IP address. If the content request included a pseudo IP address, then the FQDN corresponding to that pseudo IP address (such as the FQDN mapped to the FQDN in the FQDN_to_nr_IP table) may be resolved to a real IP address by issuing a DNS request, receiving a response including a real IP address, modifying the content request to include the real IP address, and sending the modified content request to the real IP address. An example method of sending content requests in bypass of the intermediary server 118, 120 is described below with respect to FIG. 7.

If the routing rule is determined 516 to not require bypassing of the intermediary server 118, 120, then the content request including the FQDN determined at one of steps 504 and 508 is sent 520 to the intermediary server 118, 120.

If a routing rule is not found 512 for the FQDN determined at one of steps 504 and 508, then an attempt may be made to get 522 a routing rule corresponding to one or both of a port and a protocol (HTTP, TCP, VPN, CONNECT, etc.) corresponding to the content request, such as in a port_proto_to_rules table that maps each port and/or protocol to a routing rule corresponding to the each port and/or protocol. If a routing rule is determined 524 to be found, then the routing rule is applied at step 516 as described above. If a rule is determined 524 to not be found, then a default rule may be set 526 and this default rule applied at step 516 as described above.

In some embodiments, the routing rules associated with a particular FQDN, protocol, and/or port may be dynamically changed, such as based on additional tests for requested FQDNs. For instance, content requests may be sent through the intermediary servers 118, 120 for the content stored far from the client but close to the intermediary server, or bypassed for the content stored closer to the client than to intermediary server as determined from testing response times for content requests.

In some embodiments, in addition to specifying whether content requests should bypass the intermediary servers 118, 120, the routing rules may further specify, based on the attributes of the content request, other aspects of the routing of the content request. For example, a routing rule may specify additional information, such as whether to send the content request through the proxy or VPN, or which intermediary server 118, 120 to use. In one implementation, VPR 104 submits two or more content requests to at least two different intermediary servers. The intermediary server 118, 120 for each content request is determined by obtaining one or more parameters of the content request from the group of domain name associated with that IP address, port and protocol, and then matching these parameters with one or more routing rules. For instance, the intermediary server 118, 120 for a requested domain is selected to retrieve content specific to the location of intermediary server (such as local news), or to improve performance (for instance, to minimize deviation from the direct route between the client and the content server).

In some embodiments, the DNS resolver 108 may use only rules specifying whether to bypass an intermediary server, whereas the content router 110 may use additional information to route the content request through requested module 112-116 or some other module. In one example, a routing rule may specify sending TCP traffic for destination port 80 through HTTP proxy 112, all other TCP traffic through CONNECT proxy 114 and traffic using any other protocol is routed through VPN module 116. In another example, routing rules may dynamically change to increase security in public WiFi hotspots where unencrypted data exchange can be intercepted by third parties. For instance, HTTP traffic (TCP port 80) can be sent through HTTP proxy to improve performance in secure WiFi hotspot, or through secure VPN to protect user in public WiFi hotspot. The method by which the security of a WiFi hotspot is determined may be according to U.S. Application Ser. No. 61/921,781 filed Dec. 30, 2013 and entitled SYSTEM AND METHOD FOR SECURITY AND QUALITY ASSESSMENT OF WIRELESS ACCESS POINTS, which is hereby incorporated by reference in its entirety for all purposes. The method by which the security of a WiFi hotspot is determined may also be according to U.S. application Ser. No. 14/574,240 filed Dec. 17, 2014 and entitled SYSTEM AND METHOD FOR SECURITY AND QUALITY ASSESSMENT OF WIRELESS ACCESS POINTS, which is hereby incorporated by reference in its entirety for all purposes.

Figure 6:
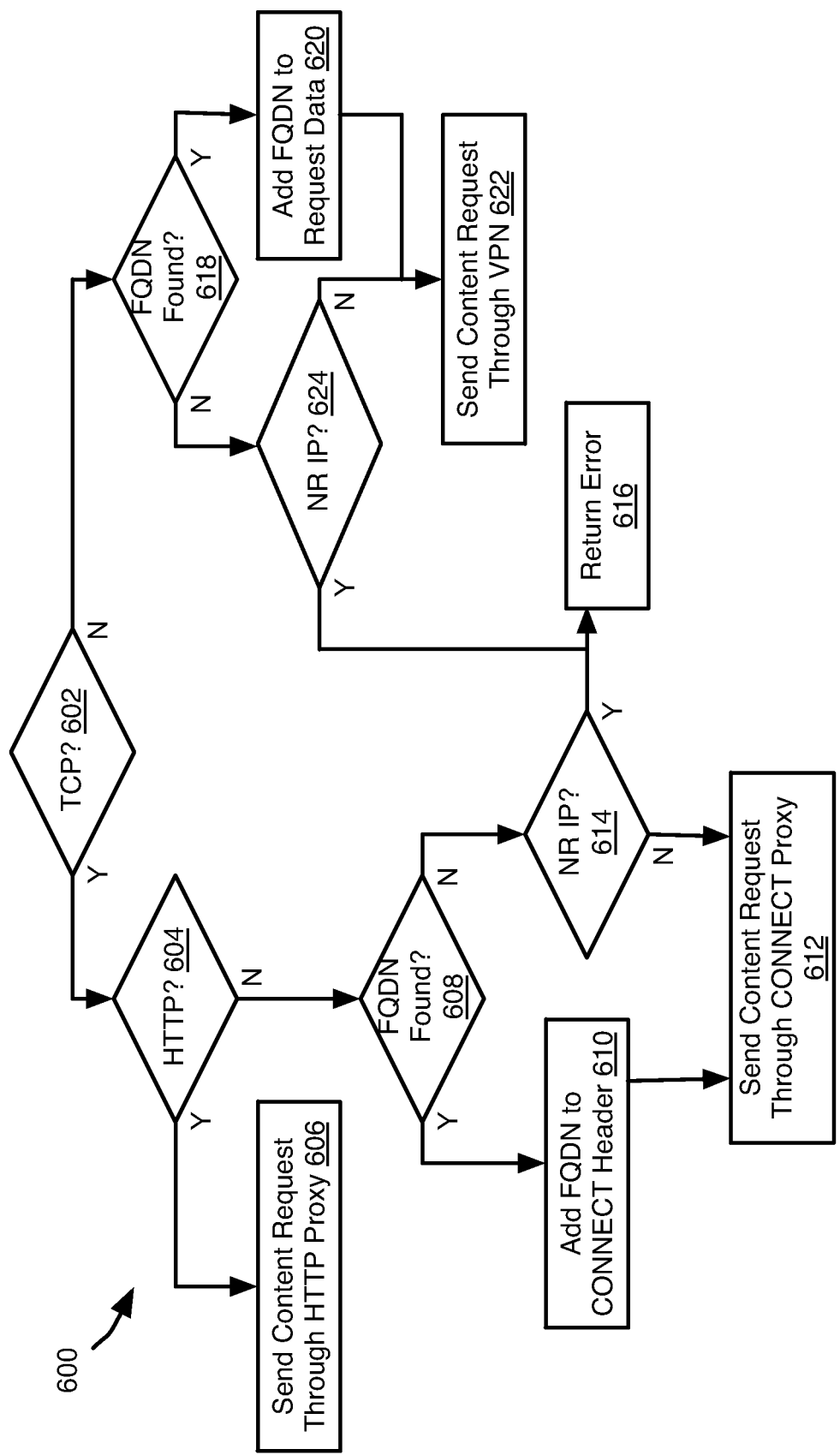
FIG. 6 is a process flow diagram of a method for processing TCP content requests in accordance with an embodiment of the present invention.

FIG. 6 illustrates a method 600 that may be executed by a VPR 104, such as by the content router 110 with respect to content requests intercepted by the traffic interceptor 106. The method 600 may be executed in combination with the methods of FIGS. 3-5. Specifically, content requests with their corresponding FQDNs, if included in the content requests or added thereto according to the methods of FIGS. 3-5, are determined to be routed to an intermediary server 118, 120 according to some or all of the methods 300-500 may be processed according to the protocol in which the content requests were generated.

For example, the method 600 may be performed with respect to an intercepted content request. The method 600 may include determining 602 whether the content request is a transmission control protocol (TCP) content request. If so, whether the content request is an HTTP (hypertext transmission protocol) request is evaluated at step 604. If so, then the content request is sent 606 through the HTTP proxy 112 to the intermediary server 118.

If the content request is determined 604 not to be an HTTP request, then whether an FQDN was found in the content request or resolved to the content request according to a pseudo IP address as described above. If so, then the FQDN is added to the CONNECT header of the content request and the content request as modified is sent 612 through the CONNECT proxy 114. If no FQDN is determined 608 to be found, then the method 600 includes evaluating 614 whether the content request included a pseudo IP address. If not, then the content request included a real IP address and may be sent 612 through CONNECT proxy 114. If the content request is found 614 to include a pseudo IP address then an error is returned 616. In one embodiment, the FQDN is added to the CONNECT request only if that FQDN is uniquely associated with an IP address. If more than one FQDN is associated with the same real IP address, the request is sent through the CONNECT proxy without adding the FQDN in such embodiments.

If the content request is determined 602 to be other than a TCP content request, then the method 600 may include evaluating 618 whether an FQDN was found in the content request or resolved to the content request according to a pseudo IP address as described above. If so, then the FQDN is added 620 to the content request and the content request is sent 622 through the VPN module 116. If an FQDN is determined 618 not to be found in or for the content request, then at step 624 it is evaluated whether the content request includes a pseudo IP address. If so, then an error is returned 616. If not, then the content request is sent 622 through the VPN module 622.

FIG. 6 is one example of three possible protocols (HTTP, CONNECT, VPN) for which content requests may be received. In other embodiments, other protocols may be used and content requests routed through corresponding modules for implementing transmission of such content requests.

Figure 7:
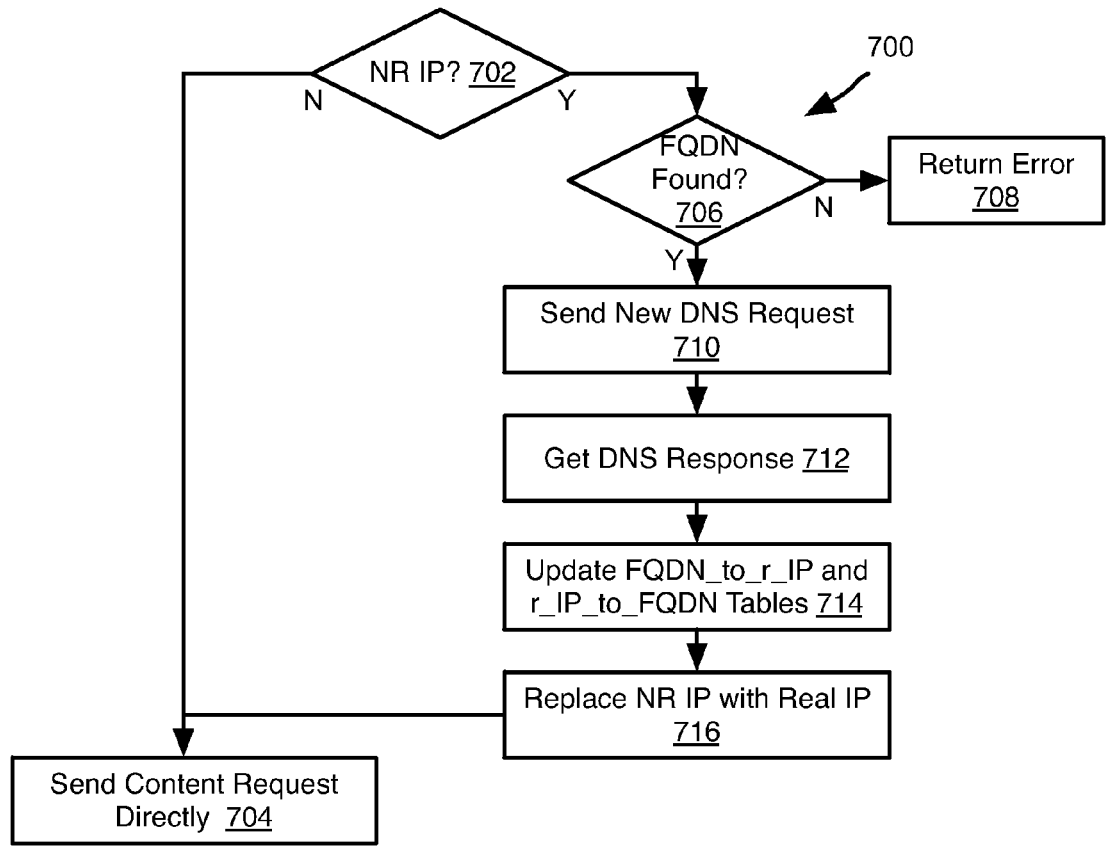
FIG. 7 is a process flow diagram of a method for processing content requests including non-routable IP addresses including bypassing of an intermediary server in accordance with an embodiment of the present invention.

FIG. 7 illustrates an example method 700 by which the VPR 104, specifically the content router 110, may process content requests selected to bypass the intermediary server, such as according to the method 500 of FIG. 5. The method 700 may include determining 702 whether the content request includes a pseudo IP address. If not, then the content request is simply sent 704 to the real IP address included in the content request. If so, then the method 700 may include evaluating 706 whether an FQDN is found corresponding to the pseudo IP address, such as in the nr_IP_to_FQDN table. If not, then an error is returned 708. If so, then a real IP address is obtained for the FQDN by sending 710 a DNS request with the FQDN, getting 712 a response to the DNS request with the real IP address, updating 714 the FQDN_to_r_IP and r_IP_to_FQDN tables to include the mapping between the FQDN and the real IP address, and replacing 716 the pseudo IP address with the real IP address in the content request. The content request as modified may then be sent 704 to the real IP address. In addition to storing the mapping between domain names and IP addresses, content router may also store mappings between non-routable IP addresses and real IP addresses, updating this mapping upon receiving the real IP address after a non-routable IP address is already assigned to the same domain.

FIGS. 8A through 8D illustrate a method 800 that may be executed by the intermediary server 118, 120 for content requests for various protocols. The steps of FIG. 8A may be executed for HTTP content requests. For HTTP requests, the method 800 may include determining 702 whether the content request includes a pseudo IP address. If not, then the content request is simply sent 804 to the real IP address included in the content request. If so, then the method 800 may include getting 806 an FQDN from the host header of the HTTP content request. A real IP address is obtained for the FQDN by sending 808 a DNS request with the FQDN, getting 810 a response to the DNS request with the real IP address, and replacing 812 the pseudo IP address with the real IP address in the HTTP content request. The HTTP content request as modified may then be sent 804 to the real IP address.

Figure 8A:
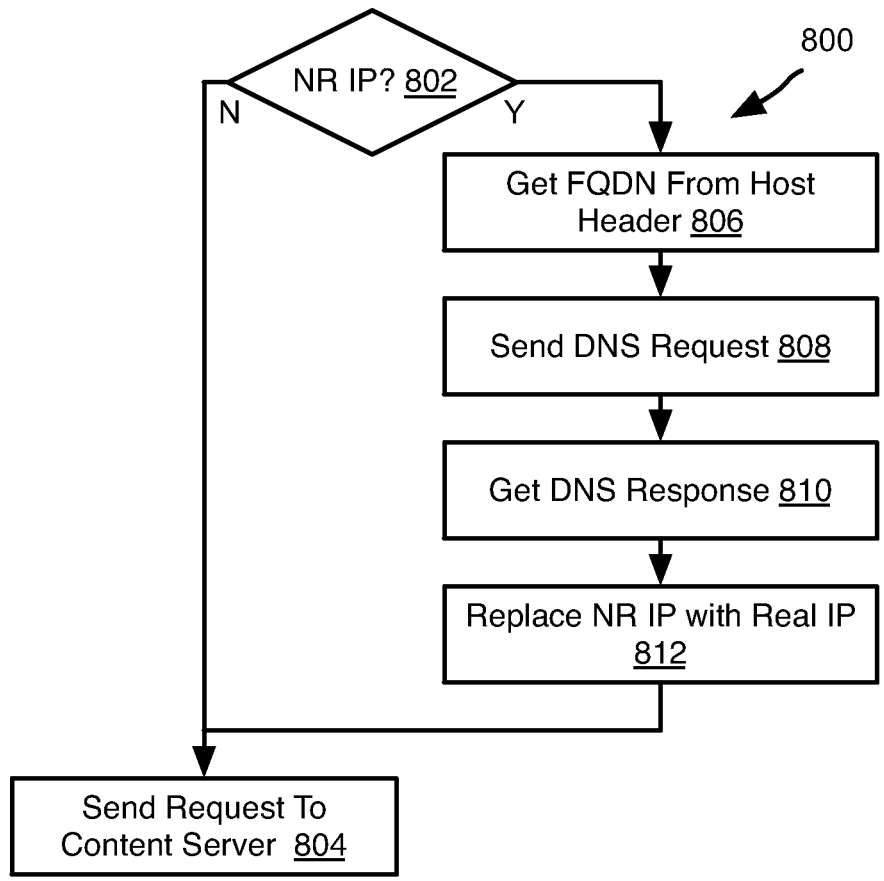
FIGS. 8A through 8C are process flow diagrams of method for forwarding content requests by an intermediary server for various protocols in accordance with an embodiment of the present invention.
Figure 8B:
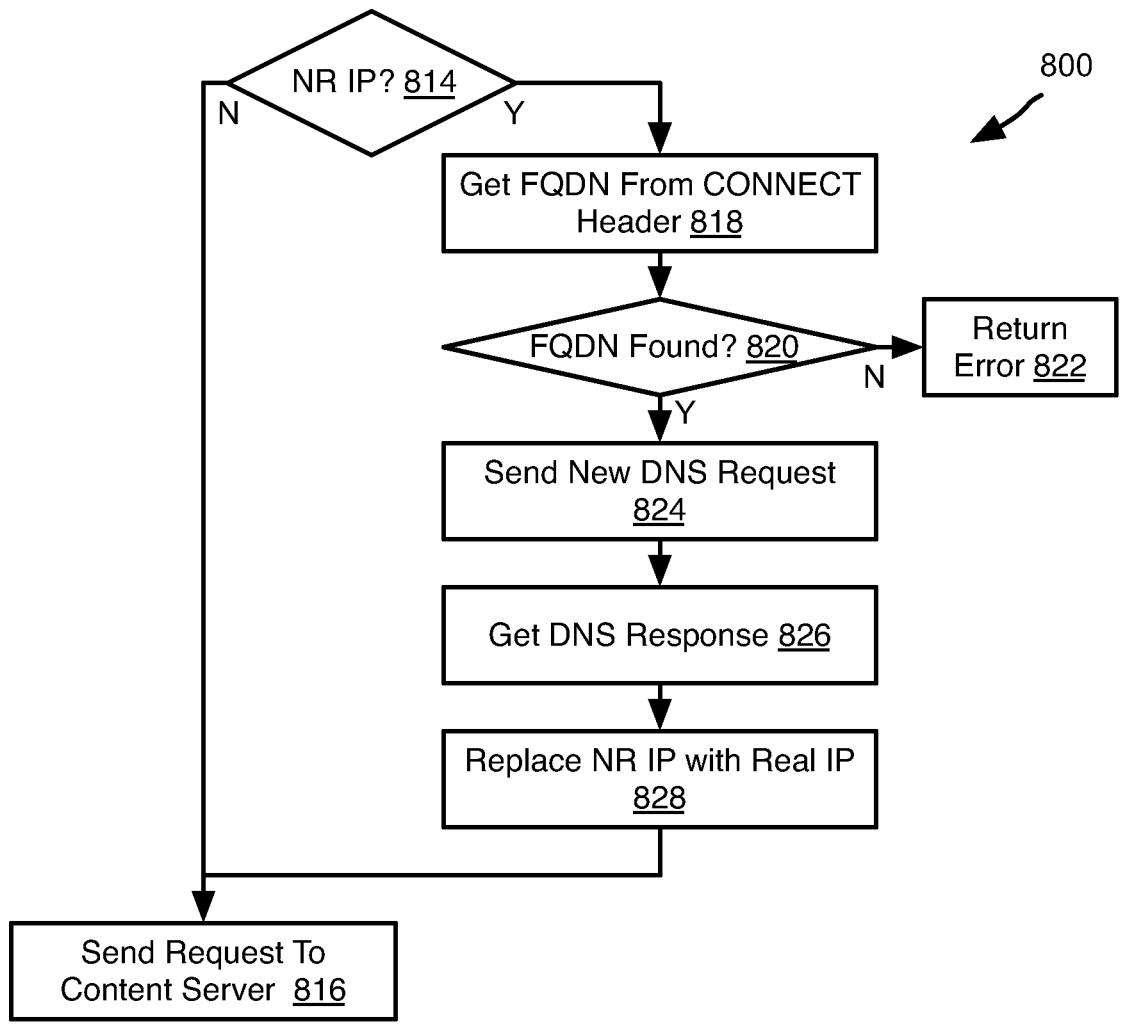
Figure 8C:
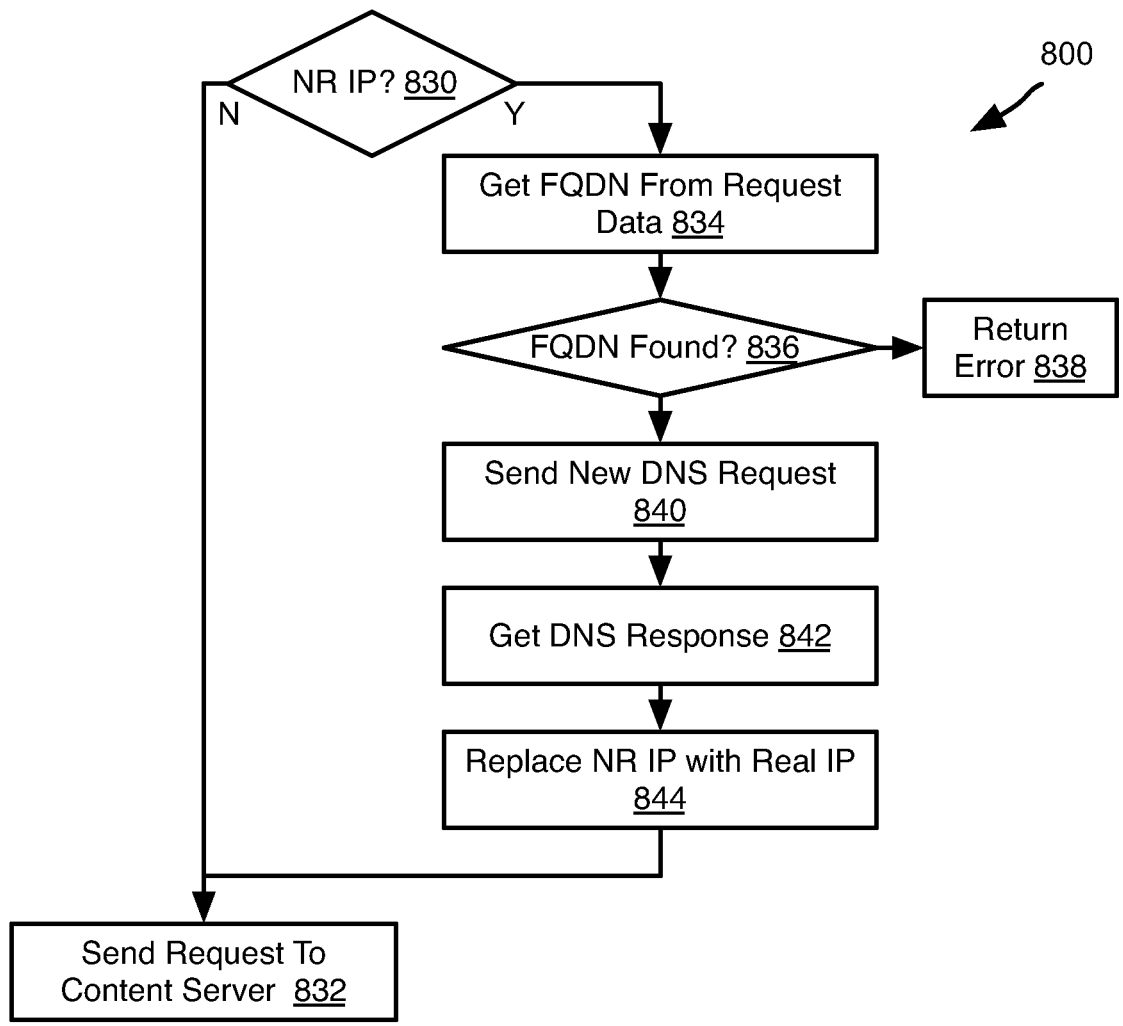

As is apparent from FIG. 8A and as will be apparent with respect to FIGS. 8B through 8D, content requests modified to include a FQDN due to their including a pseudo IP address as described in the other methods herein may still include the pseudo IP address when transmitted to the intermediary server 118, 120, such as in a destination IP field, thereby facilitating determining whether DNS resolution by the intermediary server 118, 120 is required.

Referring to FIG. 8B, for non-HTTP TCP content requests, the method 80 may include determining 814 whether the content request includes a pseudo IP address. If not, then the content request is simply sent 816 to the real IP address included in the content request. If so, then the method 800 may include attempting to get 818 a FQDN from the CONNECT header and evaluating 820 whether an FQDN is found in the CONNECT header. If not, then an error is returned 822. If so, then a real IP address is obtained for the FQDN by sending 824 a DNS request with the FQDN, getting 826 a response to the DNS request with the real IP address, and replacing 828 the pseudo IP address with the real IP address in the content request. The content request as modified may then be sent 816 to the real IP address.

Referring to FIG. 8C, for VPN content requests, the method 80 may include determining 830 whether the content request includes a pseudo IP address. If not, then the content request is simply sent 832 to the real IP address included in the content request. If so, then the method 800 may include attempting to get 834 a FQDN from the data included in the content request and evaluating 836 whether an FQDN is found in the request data. If not, then an error is returned 838. If so, then a real IP address is obtained for the FQDN by sending 840 a DNS request with the FQDN, getting 842 a response to the DNS request with the real IP address, and replacing 844 the pseudo IP address with the real IP address in the content request. The content request as modified may then be sent 832 to the real IP address.

FIGS. 8A through 8C describe methods wherein DNS resolution is performed by requesting DNS name resolution from a DNS server. However, the method 800 may further include caching domain name resolutions, such as in a FQDN_to_r_IP table that maps each FQDN to a real IP address previously received for that FQDN. Accordingly, upon identifying a FQDN for a content request, the real IP address may be retrieved form this table.

In some embodiments, content requests may be generated by the VPR that do not include actual domain names but rather pointers to strings representing the domain names. A table including the domain names may be shared between the VPR 104 and the intermediary server 118, 120 such that the intermediary server may resolve pointers to domain names by resolving each pointer to a text string in the table.

Figure 9:
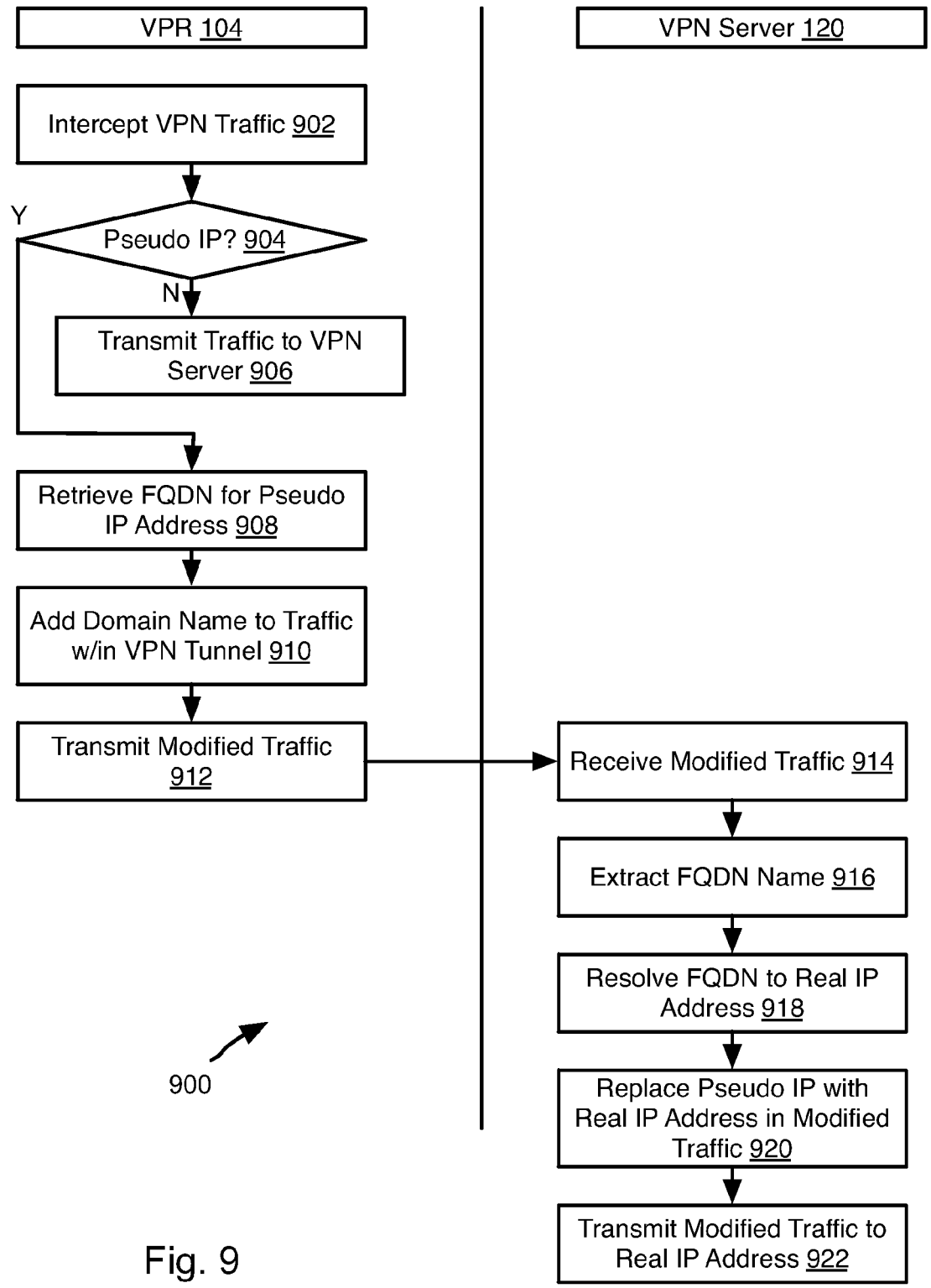
FIG. 9 is a process flow diagram for processing VPN traffic in accordance with an embodiment of the present invention.

FIG. 9 illustrates a method 900 that may be executed by the VPR 104 and an intermediary server 120 functioning as a VPN server 120. The method 900 may include intercepting 902 by the VPR 104 VPN traffic and evaluating 904 whether the traffic includes a pseudo IP address. If not, then the traffic may be transmitted 906 to the VPN server 120 without modification of addressing of the traffic.

If so, then the method 900 may include retrieving 908 the FQDN for the pseudo IP address, such as from the FQDN_to_nr_IP table described above. The FQDN may then be added 910 to the traffic within the VPN tunnel and the modified traffic may be transmitted 912 to the VPN server 120. Adding 910 of the FQDN may include inserting an additional packet to the traffic or adding the FQDN to a field of some or all of the packets of the intercepted 902 traffic. In one embodiment, a descriptor of the FQDN is added to the set of data packets of a TCP or a UDP connection having pseudo IP as a destination IP address, before these data packets are encapsulated inside the VPN packets.

Transmitting 912 the traffic may include first encapsulating the traffic as modified within a VPN tunnel. As known in the art, a VPN tunnel may include encrypting the packets and including the encrypted packets within VPN packets with a corresponding VPN header that are then sent to the VPN server 120. In some instances, the VPN traffic intercepted 902 may already include the FQDN, such as in a HOST, SNI, or CONNECT header, in which case steps 908-910 may be omitted and the traffic may be encapsulated and transmitted 912 to the VPN server 120 without addition of the FQDN.

The VPN server 120 may receive 914 the modified traffic, which may dis-encapsulating VPN packets to obtain the modified traffic. As known in the art, dis-encapsulating may include stripping of the VPN header and decrypting the encapsulated traffic. The FQDN may be extracted 916 by the VPN server 120 from the modified traffic and resolved 918 to a real IP address. Resolving 918 the FQDN to a real IP address may include issuing a DNS request with the FQDN and receiving the real IP address in response. Resolving 918 may include retrieving the real IP address from a table mapping previously resolved FQDNs to real IP addresses.

In some embodiments, the VPR 104 may include a pointer to a text string in the modified traffic rather than the FQDN, the text string including the FQDN. Accordingly, extracting 916 the FQDN may include retrieving the text string corresponding to the pointer.

In some embodiments, the VPR 104 and VPN server 120 may share the nr_IP_to_FQDN table, i.e. the VPR 104 may periodically transmit the table or updates to the table to the VPN server 120 such that the VPN server 120 has a current copy of the table. Accordingly, the traffic need not be modified by the VPR 104—the VPN server 120 will receive the traffic and resolve the pseudo IP addresses to FQDN using its version of the nr_IP_to_FQDN table.

Once a real IP address is obtained, the VPN server 120 may replace 920 the pseudo IP addresses in the received 914 traffic with the real IP address and transmit 922 the traffic as modified at step 920 to the real IP address, i.e. the computer system having the real IP address assigned thereto.

The method of FIG. 9 is different from the conventional approach to VPN servers. HTTP and HTTPS proxy servers must issue their own DNS requests because their data packets do not contain real destination IP address (it is replaced by the address of the proxy server). However, prior art VPN servers do not perform additional DNS requests for data packets already containing a destination IP address—they just remove encapsulation headers and send original packets to their destinations.

Figure 10:
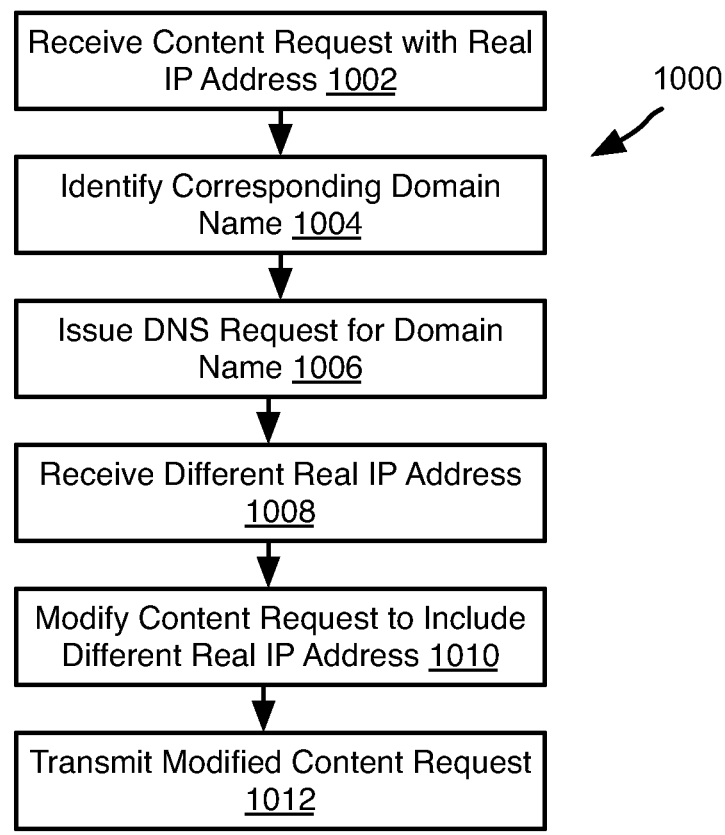
FIG. 10 is a process flow diagram for reducing latency in VPN sessions in accordance with an embodiment of the present invention.

Referring to FIG. 10, in some embodiments a VPN server 120 may reduce latency for client devices connecting thereto regardless of whether the client devices execute a VPR 104 as described herein. For example, the VPN server 120 may perform the illustrated method 1000 with respect to content requests received within a VPN connection. The method 1000 may include receiving 1002 a content request including a routable IP address and identifying 1004 a corresponding domain name for the routable IP address, such as by issuing a reverse DNS (rDNS) request to a DNS server or retrieving the routable IP address from a cache mapping routable IP addresses to domain names according to responses to previous DNS or rDNS requests.

The method 1000 may further include issuing 1006 a DNS request for the domain name identified at step 1004 and receiving 1008 a routable IP address in return that may be different from that identified at step 1004. Upon receiving 1008 the different routable IP address, the content request may be modified to include the different routable IP address and transmitted 1012 to the server system having the different routable IP address.

For instance, a client device in Europe issues DNS request for a domain corresponding to content servers both in Europe and United States of America, and then receives real IP address for a content server in Europe. This IP address decreases access latency when the content request is issued directly from the client while in Europe. However, if the client from Europe establishes connection to a VPN server 120 in United States of America, the provided real IP address may cause significant performance degradation: client request will be sent from VPN server 120 in the USA to the content server in Europe. The response will be sent to VPN server 120 in USA and then back to the client in Europe. By the VPN server 120 issuing 1006 a DNS request, the domain name may be resolved to the IP address of a closer server system corresponding to the same domain name thereby reducing latency.

In some embodiments, Accordingly to the present invention, VPN server 120 detects that it needs to issue 1006 an additional DNS request and replaces provided destination IP address by the one obtained from DNS response. In the example above, the VPN server 120 may evaluate the real IP address and detect that the provided real IP references content server in Europe. In response, the VPN server 120 issues 1006 its own DNS request and receives 1008 a response referencing a closer content server, e.g. the USA in the above example, thereby improving performance. In one implementation, detection that additional DNS request is needed comprises (a) resolving a geo-location of the requested real IP address received at step 1002 and (b) causing additional DNS request to be issued if the requested real IP address is determined to reference a content server located in a geographic region different from the one of the VPN server 120, e.g. the content server is outside of a political or geographic region (country, state, continent) or is more than a threshold distance away from the VPN server 120. The VPN server 120 may therefore be made to store, or be programmed to obtain, its own location to facilitate this comparison. In instances where the geographic regions of the VPN server 120 and content server are the same or are otherwise determined to be within the threshold distance from one another, then the real IP address received at step 1002 is not changed by the VPN server 120 and the content requests are transmitted to the content sever corresponding to the real IP address received at step 1002.

Figure 11:
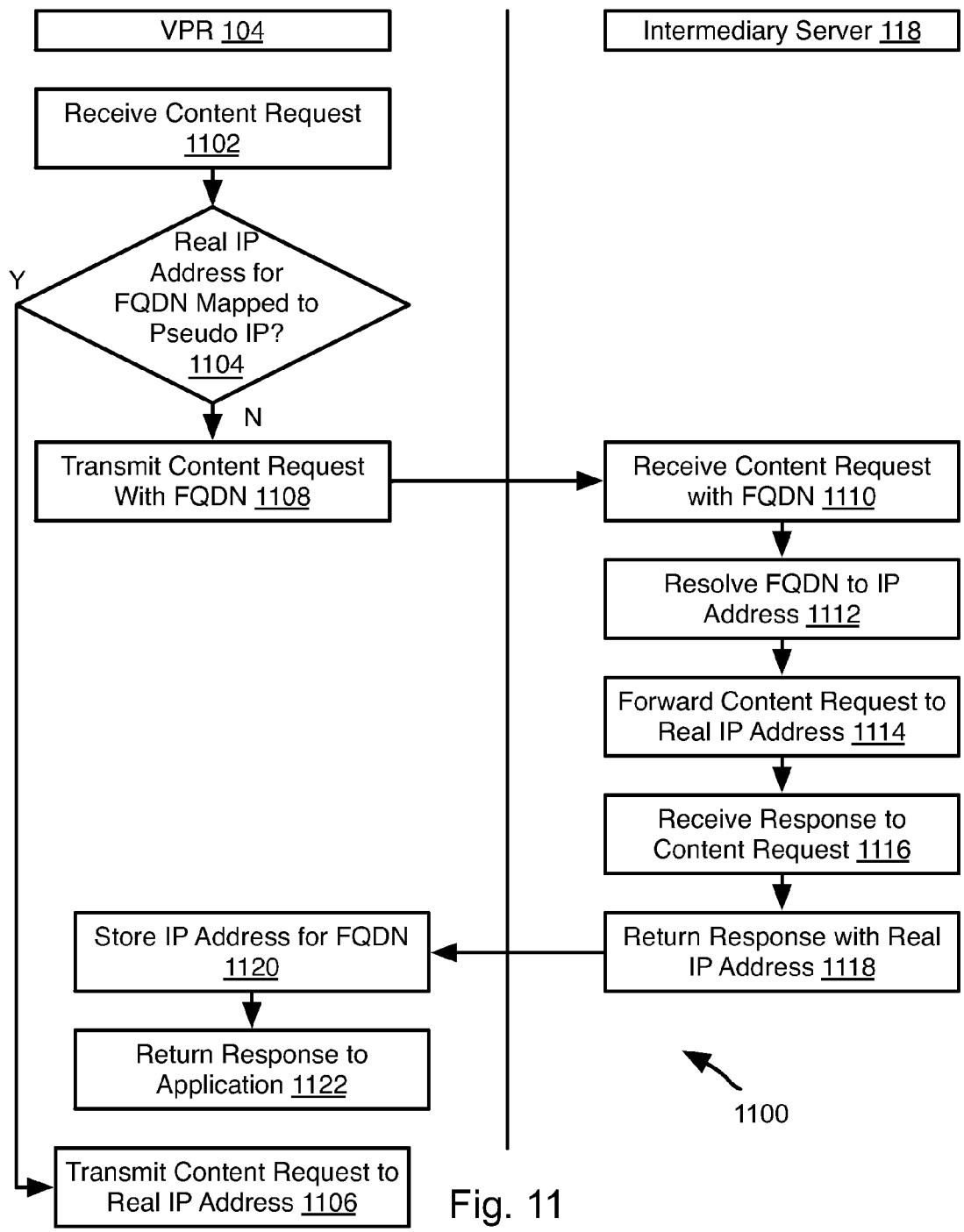
FIG. 11 is a process flow diagram of a method for suppressing DNS requests while populating a IP address table of a client device in accordance with an embodiment of the present invention.

FIG. 11 illustrates a method 1100 that may be executed by the VPR 104 and an intermediary server 118 in order to reduce DNS requests by both of the VPR 104 and the intermediary server 118. The method 1100 may include receiving 1102 a content request and evaluating 1104 whether the content request at least one of (a) includes a real IP address, (b) includes a pseudo IP address that is mapped to a FQDN for which the real IP address is stored by the VPR 104, or (c) includes a FQDN for which the VPR 104 has stored a corresponding IP address. For example, if the content request includes a pseudo IP address, the corresponding FQDN may be looked up in the nr_IP_to_FQDN table. The real IP address corresponding to the FQDN included in the content request or determined from the pseudo IP address may be retrieved from the FQDN_to_r_IP table if an entry for that FQDN exists. Stated differently, step 1104 may include determining whether a real IP address may be determined by the VPR 104 without issuing a DNS request using only cached data on the computer system 1300 by the VPR 104.

If the real IP address to which the content request is addressed can be resolved by the VPR as described above with respect to step 1104, then the content request is transmitted 1106 by the VPR 104 to the server system corresponding to that real IP address directly without first transmitting the content request to the intermediary server 118.

If the content request is found 1104 to include a pseudo IP address or FQDN for which a real IP address cannot be determined using only cached data stored on the computer system 1300, then the content request may be transmitted 1108 to the intermediary server 118 with the FQDN included in the request or corresponding to the pseudo IP address included in the request.

The intermediary server 118 receives 1110 the request with the FQDN and resolves 1110 the FQDN to a real IP address by issuing a DNS request with the FQDN and receiving a response or by finding a mapping of the FQDN to the real IP address in locally stored data of the intermediary server 118. The intermediary server then adds the real IP address to the content request and forwards 1114 the content request to the real IP address, i.e. the server assigned the real IP address, which processes the content request and returns a response to the intermediary server 118. The intermediary server 118 receives 1116 the response to the content request and returns 1118 the response to the VPR 104 along with the real IP address for the FQDN as determined at step 1112. Other date included in a response to a DNS request may also be returned, such as a TTL of the real IP address for the FQDN or other real IP addresses associated with the FQDN or the requested content (see, e.g. FIG. 12 and corresponding description).

For example, the real IP address or addresses and any additional data (e.g. TTL) may be returned within HTTP headers returned 1118 with the requested content. In another implementation, the real IP address is returned in a data packet recognized by the VPR 104 from its data pattern or location inside the returned data set. For instance, the real IP address could be returned in a first content packet inserted before packets of the requested content. The VPR 104 would retrieve the real IP address and remove the first packet before returning the response to the requesting application.

In another implementation, the real IP address for one content request is returned together with content data for another content request. In one embodiment, the intermediary server 118, 120 returns a set of correspondences between multiple domain names and their real IPs together with content data. Domain names corresponding to listed IPs could refer to the previously issued content requests, or to the content requests expected to be issued in the future.

For example, after receiving request for the content from the domain A, intermediary server 118, 120 may issue DNS requests for domains referenced by the main site A (such domains being already known to the server, or obtained by parsing HTML response from the domain A) and provide set of such domains and their real IPs with response for the content request from domain A. As a result, the VPR 104 will need to use intermediary server 118, 120 only for the small amount of content requests to unknown domains, thereby further improving performance.

The VPR 104 receives the response and stores 1122 the real IP address (or addresses) mapped to the FQDN (or FQDNs), such as by storing the correspondence between the FQDN and the real IP address in the FQDN_to_r_IP and r_IP_to_FQDN tables. The response may further be returned by the VPR 104 to the application that issued the received 1102 content request. The response may include or exclude the real IP address.

In subsequent iterations of the method 1100 with respect to other content requests by the same or different application, the real IP address for the FQDN will be found at step 1104 and steps 1108-1122 may be omitted thereby reducing latency for the subsequent content requests and bypassing the intermediary server 118, 120.

Figure 12:
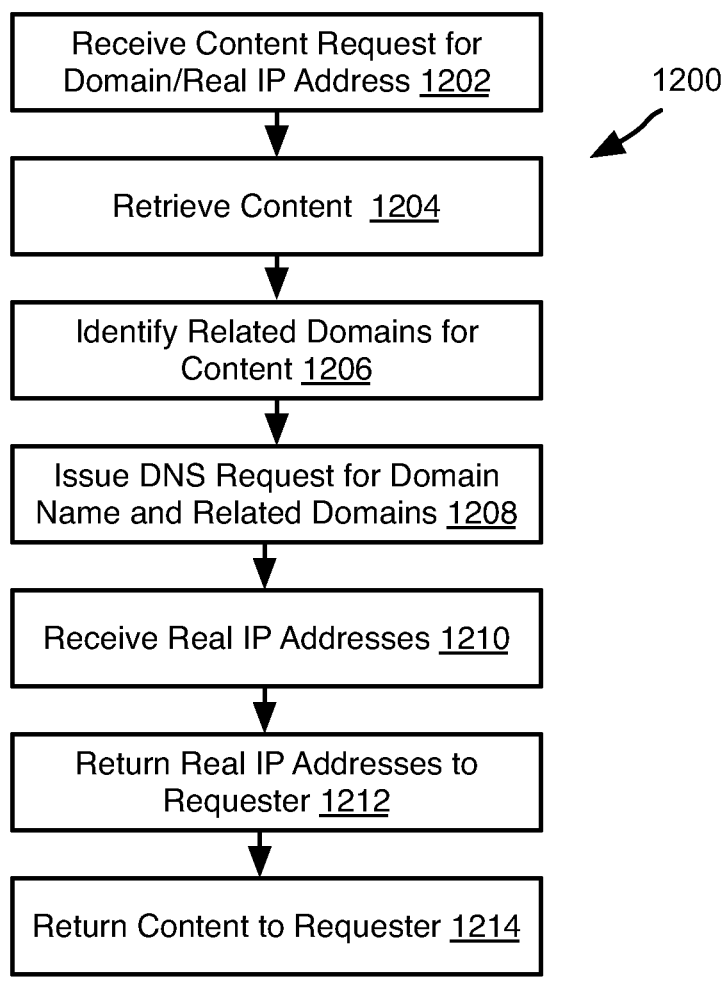
FIG. 12 is a process flow diagram of a method for providing IP addresses in anticipation of DNS requests in accordance with an embodiment of the present invention.

Referring to FIG. 12, the illustrated method 1200 may be executed by an intermediary server 118 functioning as a proxy server for client devices that may or may not be executing a VPR 104 as described herein. The method 1200 enables an intermediary server to anticipate at least a portion of subsequent DNS requests and reduce latency by populating a cache of a client device with corresponding real IP addresses.

The method 1200 may include receiving 1202 a request for content that is addressed to a domain name or a real IP address and retrieving 1204 the requested content from the server addressed by the domain name or real IP address, such as by transmitting the content request addressed to the real IP address and receiving a response to the content request form the server associated with the real IP address. Where the content request includes a domain name, the intermediary server 118 may first resolve the domain name to a real IP address by retrieving it from a locally stored cache or issuing a DNS request with the domain name and receiving a response with the real IP address.

The method 1200 may further include identifying 1206 related domains for the content. For example, where the content retrieved 1204 is a web page, domains reference by links in the web page may be identified 1206. In another example, a list of related domains can be created by observing previous sets of domain requests following original domain requests; this method can be used for HTTPS content that can't be parsed by the intermediary server. The method 1200 may further include issuing 1208 DNS requests for the related domains and receiving 1210 real IP addresses for the related domains. The method 1200 may further include returning the real IP addresses for the related domains and returning 1214 the retrieved 1204 content to the client device from which the content request was received 1204. Where the content request included a domain, the real IP address for that domain as well as for the related domains may be returned 1212. The real IP addresses and content may be included in the same or different messages.

Upon receiving the real IP addresses, the client device may cache them such that subsequent requests for content may be transmitted directly to servers corresponding to the IP addresses without transmitting of the subsequent content requests to the intermediary server 118. For example, the client device may store mappings between the related domains and the real IP addresses in FQDN_to_r_IP and r_IP_to_FQDN tables.

The method 1200 may further include the server preemptively establishing TCP connections to one or more real IP addresses of the related domains, without waiting for the client to send the content requests to these domains. After receiving such content request, server passes it to the destination without waiting for the TCP handshake, thereby improving performance.

The method 1200 may further include the server preemptively preforming TLS handshakes for one or more related domains, for instance ones known to use HTTPS protocol for content requests. To do this, the server obtains a session ID or a session ticket from the TLS handshake performed by the client for a particular domain, uses obtained value to preemptively initiate another TLS handshake for the same domain, and then passes TLS response to the client. Client caches the TLS response and returns it to the application after it issues TLS request for the same domain with the same session ID or a ticket, thereby further improving performance. Server can obtain a session ID or a session ticket by observing a TLS handshake initiated by the client, or by receiving such value from the client; neither TLS session ID or a session ticket have to be kept secret because they don't disclose encryption keys that should be known only to the client and the content provider.

Figure 13:
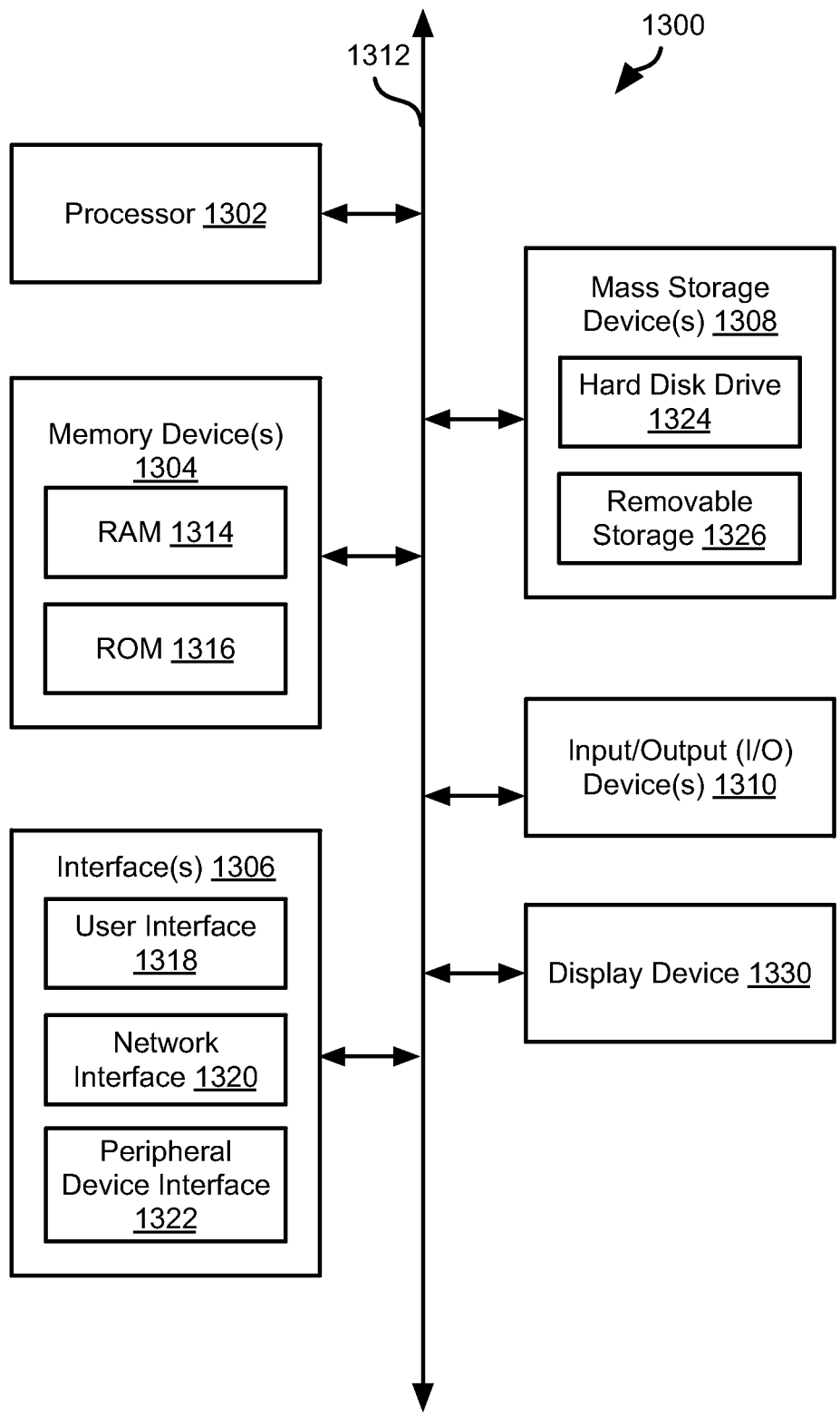
FIG. 13 is a schematic block diagram of a computer system suitable for implementing methods in accordance with embodiments of the present invention.

FIG. 13 is a block diagram illustrating an example computing device 1300 which may host a VPR 104. The intermediary server 118, 120 may also have some or all of the attributes of the computing device 1300. Computing device 1300 may be used to perform various procedures, such as those discussed herein. Computing device 1300 can function as a server, a client, or any other computing entity. Computing device can perform various monitoring functions as discussed herein, and can execute one or more application programs, such as the application programs described herein. Computing device 1300 can be any of a wide variety of computing devices, such as a desktop computer, a notebook computer, a server computer, a handheld computer, tablet computer and the like.

Computing device 1300 includes one or more processor(s) 1302, one or more memory device(s) 1304, one or more interface(s) 1306, one or more mass storage device(s) 1308, one or more Input/Output (I/O) device(s) 1310, and a display device 1330 all of which are coupled to a bus 1312. Processor(s) 1302 include one or more processors or controllers that execute instructions stored in memory device(s) 1304 and/or mass storage device(s) 1308. Processor(s) 1302 may also include various types of computer-readable media, such as cache memory.

Memory device(s) 1304 include various computer-readable media, such as volatile memory (e.g., random access memory (RAM) 1314) and/or nonvolatile memory (e.g., read-only memory (ROM) 1316). Memory device(s) 1304 may also include rewritable ROM, such as Flash memory.

Mass storage device(s) 1308 include various computer readable media, such as magnetic tapes, magnetic disks, optical disks, solid-state memory (e.g., Flash memory), and so forth. As shown in FIG. 13, a particular mass storage device is a hard disk drive 1324. Various drives may also be included in mass storage device(s) 1308 to enable reading from and/or writing to the various computer readable media. Mass storage device(s) 1308 include removable media 1326 and/or non-removable media.

I/O device(s) 1310 include various devices that allow data and/or other information to be input to or retrieved from computing device 1300. Example I/O device(s) 1310 include cursor control devices, keyboards, keypads, microphones, monitors or other display devices, speakers, printers, network interface cards, modems, lenses, CCDs or other image capture devices, and the like.

Display device 1330 includes any type of device capable of displaying information to one or more users of computing device 1300. Examples of display device 1330 include a monitor, display terminal, video projection device, and the like.

Interface(s) 1306 include various interfaces that allow computing device 1300 to interact with other systems, devices, or computing environments. Example interface(s) 1306 include any number of different network interfaces 1320, such as interfaces to local area networks (LANs), wide area networks (WANs), wireless networks, and the Internet. Other interface(s) include user interface 1318 and peripheral device interface 1322. The interface(s) 1306 may also include one or more user interface elements 1318. The interface(s) 1306 may also include one or more peripheral interfaces such as interfaces for printers, pointing devices (mice, track pad, etc.), keyboards, and the like.

Bus 1312 allows processor(s) 1302, memory device(s) 1304, interface(s) 1306, mass storage device(s) 1308, and I/O device(s) 1310 to communicate with one another, as well as other devices or components coupled to bus 1312. Bus 1312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1300, and are executed by processor(s) 1302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

What is claimed is:

1. A method for domain resolution suppression, the method comprising:
    intercepting, from an application executing on a computing device by a module executing on the computing device, a content request including a pseudo IP address;
    in response to intercepting from the application by the module the content request including the pseudo IP address, generating a modified content request including a domain name mapped to the pseudo IP address in an entry of a first data table;
    transmitting, by the computing device, the modified content request to a first server;
    receiving, by the computing device, a response to the modified content request, the response including a routable IP address corresponding to the domain name; and
    storing, by the computing device, the IP address and domain name in a second data table;
    intercepting from the application by the module, a domain resolution request including the domain name, the domain resolution request addressed to one of the first server and a third server;
    suppressing, by the module, transmission of the domain resolution request;
    returning, by the module to the application, the pseudo IP address as a response to the domain resolution request;
    storing, by the module, in the first data table the entry mapping the pseudo IP address to the domain name of the domain resolution request;
    wherein returning, by the module to the application, the pseudo internet protocol (IP) address as a response to the domain resolution request comprises returning the pseudo IP address having a time to live (TTL) attribute set to a value larger than a TTL value used for the routable IP address.

2. The method of claim 1, further comprising:
    detecting, by the computing device, a second content request from the application, the second content request including the domain name;
    In response to detecting the second content request from the application, the second content request including the domain name, retrieving, by the computing device, the routable IP address from the second data table; and
    transmitting, by the computing device, the second content request including the routable IP address to one of the first server and a second server addressed by the routable IP address.

3. The method of claim 1, comprising transmitting, by the computing device, the second content request to the second server addressed by the routable IP address thereby bypassing the first server.

* * * * *